United States Patent
Kimes et al.

(10) Patent No.: US 10,781,891 B2
(45) Date of Patent: Sep. 22, 2020

(54) DRIVE SYSTEM INCLUDING A TRANSMISSION AND MAGNETIC COUPLING DEVICE FOR AN ELECTRIC VEHICLE

(71) Applicant: Means Industries, Inc., Saginaw, MI (US)

(72) Inventors: John W. Kimes, Wayne, MI (US); Philip B. Woodley, Chicago, IL (US)

(73) Assignee: Means Industries, Inc., Saginaw, MI (US)

( * ) Notice: Subject to any disclaimer, the term of this patent is extended or adjusted under 35 U.S.C. 154(b) by 309 days.

(21) Appl. No.: 15/951,317

(22) Filed: Apr. 12, 2018

(65) Prior Publication Data

US 2018/0231105 A1    Aug. 16, 2018

Related U.S. Application Data

(63) Continuation-in-part of application No. 15/874,001, filed on Jan. 18, 2018, and a continuation-in-part of
(Continued)

(51) Int. Cl.
*F16H 3/78* (2006.01)
*F16H 3/089* (2006.01)
(Continued)

(52) U.S. Cl.
CPC ............. *F16H 3/78* (2013.01); *B60T 1/005* (2013.01); *F16H 3/089* (2013.01); *F16H 63/304* (2013.01);
(Continued)

(58) Field of Classification Search
CPC .......... F16H 3/78; F16H 3/039; F16H 63/304; F16H 2063/305; F16H 2063/3093;
(Continued)

(56) References Cited

U.S. PATENT DOCUMENTS 5,847,469 A   12/1998   Tabata et al.
5,856,709 A   1/1999   Ibaraki et al.
(Continued)

OTHER PUBLICATIONS

The International Bureau of WIPO, Written Opinion of the International Searching Authority dated Apr. 25, 2018 and International Preliminary Report on Patentability for International Application No. PCT/US2018/016986, dated Aug. 6, 2019.
(Continued)

*Primary Examiner* — Tinh Dang
(74) *Attorney, Agent, or Firm* — Brooks Kushman P.C.

(57) ABSTRACT

A drive system or powertrain including an automatic transmission (AT) for an electric vehicle is provided. At least one 3-position linear motor, 2-way clutch (i.e. CMD) is included in the transmission. The transmission includes a planetary gear set. A magnetic coupling device such as an eddy current by-pass clutch is provided to magnetically transfer a portion of rotating mechanical energy of a single electric powerplant or motor to a transmission output shaft in response to an electrical signal to synchronize angular velocities of the transmission output shaft and an output shaft of the electric powerplant during a change in state of the at least one CMD. Torque is transferred to the transmission output shaft during the change in state. A park function is also provided.

14 Claims, 19 Drawing Sheets

Related U.S. Application Data application No. 14/487,322, filed on Sep. 16, 2014, now Pat. No. 9,874,252.

(60) Provisional application No. 62/492,569, filed on May 1, 2017, provisional application No. 62/455,147, filed on Feb. 6, 2017.

(51) Int. Cl.
   *F16H 63/30* (2006.01)
   *H02K 7/11* (2006.01)
   *H02K 7/116* (2006.01)
   *H02K 41/03* (2006.01)
   *B60T 1/00* (2006.01)

(52) U.S. Cl.
   CPC .............. *H02K 7/11* (2013.01); *H02K 7/116* (2013.01); *H02K 41/03* (2013.01); *B60Y 2200/91* (2013.01); *F16H 2063/305* (2013.01); *F16H 2063/3093* (2013.01); *F16H 2200/0021* (2013.01); *F16H 2200/0039* (2013.01); *F16H 2200/2064* (2013.01); *F16H 2200/2066* (2013.01); *F16H 2200/2082* (2013.01); *F16H 2200/2094* (2013.01); *Y02T 10/641* (2013.01)

(58) Field of Classification Search
   CPC ..... F16H 2200/2023; F16H 2200/0021; F16H 2200/0039; F16H 2200/2064; F16H 2200/2066; F16H 2200/2082; F16H 2200/2094; F16H 3/089; H02K 7/11; H02K 7/116; H02K 41/03; B60T 1/005
   See application file for complete search history.

(56) References Cited

U.S. PATENT DOCUMENTS

| | | | |
|---|---|---|---|
| 5,934,395 A | 8/1999 | Koide et al. | |
| 6,000,488 A * | 12/1999 | Atkinson | B60K 17/342 180/197 |
| 6,019,699 A | 2/2000 | Hoshiya et al. | |
| 6,087,734 A | 7/2000 | Maeda et al. | |
| 6,306,057 B1 | 10/2001 | Morisawa et al. | |
| 6,344,008 B1 | 2/2002 | Nagano et al. | |
| 6,474,428 B1 | 11/2002 | Fujikawa et al. | |
| 6,640,917 B2 * | 11/2003 | Maruyama | B60K 6/48 180/65.25 |
| 7,017,693 B2 | 3/2006 | Omote et al. | |
| 7,201,690 B2 | 4/2007 | Miura et al. | |
| 7,223,200 B2 | 5/2007 | Kojima et al. | |
| 7,237,634 B2 | 7/2007 | Severinsky et al. | |
| 7,255,186 B2 | 8/2007 | Wakuta et al. | |
| 7,393,296 B2 | 7/2008 | Kano et al. | |
| 7,397,296 B1 | 7/2008 | Kiani | |
| 7,426,971 B2 | 9/2008 | Kano et al. | |
| 7,614,466 B2 | 11/2009 | Kano et al. | |
| 7,621,359 B2 | 11/2009 | Kano et al. | |
| 7,633,247 B2 | 12/2009 | Obayashi | |
| 7,690,455 B2 | 4/2010 | Kano et al. | |
| 7,942,781 B2 | 5/2011 | Kimes | |
| 7,990,007 B2 | 8/2011 | Corbin, III et al. | |
| 8,167,754 B2 | 5/2012 | Phillips | |
| 8,226,515 B2 | 7/2012 | Phillips | |
| 8,246,501 B2 | 8/2012 | Phillips | |
| 8,251,850 B2 | 8/2012 | Phillips | |
| 8,398,514 B2 | 3/2013 | Phillips | |
| 8,813,929 B2 | 8/2014 | Kimes | |
| 8,888,637 B2 | 11/2014 | Kimes | |
| 8,931,361 B2 | 1/2015 | Fitzgerald | |
| 9,109,636 B2 | 8/2015 | Kimes et al. | |
| 9,130,446 B2 | 9/2015 | Pardue et al. | |
| 9,186,977 B2 | 11/2015 | Kimes | |
| 9,303,699 B2 | 4/2016 | Kimes et al. | |
| 9,350,225 B2 | 5/2016 | Gieras et al. | |
| 9,441,708 B2 | 9/2016 | Kimes et al. | |
| 2009/0038424 A1 | 2/2009 | Schneider et al. | |
| 2010/0113217 A1 | 5/2010 | Terwart et al. | |
| 2010/0116615 A1 * | 5/2010 | Oba | B60W 10/30 192/84.3 |
| 2011/0073393 A1 | 3/2011 | Sasaki | |
| 2012/0149518 A1 * | 6/2012 | Kimes | B60L 50/16 475/5 |
| 2014/0100071 A1 | 4/2014 | Kimes | |
| 2015/0000442 A1 | 1/2015 | Kimes et al. | |
| 2015/0014116 A1 | 1/2015 | Kimes et al. | |
| 2015/0226289 A1 | 8/2015 | Klingston et al. | |
| 2016/0290426 A1 | 10/2016 | Helmer et al. | |
| 2017/0001629 A1 | 1/2017 | Vyncke et al. | |
| 2018/0106304 A1 | 4/2018 | Kimes et al. | |

OTHER PUBLICATIONS

International Searching Authority, The International Search Report and the Written Opinion of the International Searching Authority, or the Declaration for the International Application No. PCT/US2018/16986 dated Apr. 25, 2018.

SAE; Design and Experimental Demonstration of a Seamless Automated Manual Transmission using an Eddy Current Torque Bypass Clutch for Electric and Hybrid Vehicles; Marc-Olivier Lacerte, Gabriel Pouliot, Jean-Sebastien Plante, and Philippe Micheau, University de Sherbrooke; pp. 13-22.

United States Patent and Trademark Office, Non-Final Office Action for U.S. Appl. No. 15/874,001, dated Apr. 6, 2020.

* cited by examiner

DRIVE SYSTEM INCLUDING A TRANSMISSION AND MAGNETIC COUPLING DEVICE FOR AN ELECTRIC VEHICLE

CROSS-REFERENCE TO RELATED APPLICATIONS

This application claims the benefit of U.S. provisional application Ser. No. 62/492,569 filed May 1, 2017. This application is a continuation-in-part of U.S. patent application Ser. No. 15/874,001 filed Jan. 18, 2018 which claims the benefit of U.S. provisional application Ser. No. 62/455,147 filed Feb. 6, 2017 and which is a continuation-in-part of U.S. patent application Ser. No. 14/487,322 filed Sep. 16, 2014, (now U.S. Pat. No. 9,874,252) the disclosures of which are hereby incorporated in their entirety by reference herein.

TECHNICAL FIELD

This invention relates to drive systems or powertrains including transmissions for electric vehicles.

Overview

A battery electric vehicle (BEV) is a type of electric vehicle (EV) that uses chemical energy stored in rechargeable battery packs. BEVs use electric motors and motor controllers instead of internal combustion engines (ICEs) for propulsion.

As described in U.S. Pat. Nos. 8,167,754; 8,226,515; 8,246,501; 8,251,850; and 8,398,514, to produce a more efficient vehicle, common hybrid vehicle powertrains combine an electric motor and a conventional engine. Torque from the engine and the electric motor is typically channeled to the vehicle's driven wheels via a transmission. Efficiency of a hybrid vehicle powertrain is typically related to the percentage of time and during what type of driving conditions the engine must be run in addition to or in place of the electric motor to power the vehicle.

Some hybrid powertrains employ a single electric motor in combination with the engine. In such powertrains, transmission output, and hence vehicle speed, is directly related to the speeds and torques of the engine and the electric motor. Other hybrid powertrains employ two electric motors in combination with the engine to power the vehicle.

A hybrid powertrain utilizing an engine and two electric motors may connect the engine and the electric motors to a transmission such that torque and speed of the engine may be selected independently of vehicle speed and desired acceleration. Such control of the engine is typically achieved by varying individual torque contribution from the two electric motors. Thus, a hybrid powertrain utilizing an engine in combination with two electric motors may provide suitable torque contribution from each of the engine and the two motors and afford improved overall vehicle efficiency.

Other U.S. patents which describe hybrid transmissions or power trains include: U.S. Pat. Nos. 5,847,469; 5,856,709; 5,934,395; 6,019,699; 6,306,057; 6,344,008; 7,201,690; 7,223,200; 7,237,634; 7,255,186; 7,393,296; 7,397,296; 7,426,971; 7,614,466; 7,621,359; 7,633,247; and 7,690,455.

U.S. patent documents assigned to the same assignee as the present application and which are related to the present application include U.S. Pat. Nos. 8,813,929; 8,888,637; 9,109,636, 9,186,977; 9,303,699; and 9,441,708 and U.S. published applications 2014/0100071; 2015/0000442; and 2015/0014116. The disclosures of all of the above-noted, commonly assigned patent documents are hereby incorporated in their entirety by reference herein.

Some of the above related patent documents assigned to the assignee of the present application disclose a 2-position, linear motor eCMD (electrically controllable mechanical diode). This device is a dynamic one-way clutch as both races (i.e. notch and pocket plates) rotate. The linear motor or actuator moves which, in turn, moves plungers coupled to struts, via a magnetic field produced by a stator. The actuator has a ring of permanent magnets that latches the clutch into two states, ON and OFF. Power is only consumed during the transition from one state to the other. Once in the desired state, the magnet latches and power is cut.

U.S. patent documents 2015/0000442 and U.S. Pat. No. 9,441,708 disclose 3-position, linear motor, magnetically-latching, 2-way CMDs.

A plug-in hybrid electric vehicle (PHEV), plug-in hybrid vehicle (PHV), or plug-in hybrid is a hybrid vehicle which utilizes rechargeable batteries, or another energy storage device, that can be restored to full charge by connecting a plug to an external electric power source (usually a normal electric wall socket). A PHEV shares the characteristics of both a conventional hybrid electric vehicle, having an electric motor and an internal combustion engine (ICE); and of an all-electric vehicle, having a plug to connect to the electrical grid. Most PHEVs on the road today are passenger cars, but there are also PHEV versions of commercial vehicles and vans, utility trucks, buses, trains, motorcycles, scooters, and military vehicles.

A multiple-ratio (i.e., step-ratio) automatic transmission in an automotive vehicle powertrain adjusts a gear ratio between a torque source and a driveshaft to meet drivability requirements under dynamically-changing driving conditions. Ratio changes are achieved by engaging a so-called "on-coming clutch" ("OCC") as a so-called "off-going clutch" ("OGC") is released. The clutches, which may be referred to as transmission friction elements or brakes, establish and disestablish power flow paths from an internal combustion engine to vehicle traction wheels. During acceleration of the vehicle, the overall speed ratio, which is the ratio of transmission input shaft speed to transmission output shaft speed, is reduced as vehicle speed increases for a given engine throttle settling. This is an up-shift.

In the case of a synchronous up-shift, the OCC engages to lower both the gear ratio (i.e., the overall speed ratio) and the torque ratio (the ratio of output torque to input torque). The synchronous up-shift event can be divided into three phases, which may be referred to as a preparatory phase, a torque phase, and an inertia phase. The torque phase is a time period when the OCC torque is controlled to decrease toward a non-significant level with an intention to disengage it. Simultaneously, during the torque phase, the OCC is controlled to increase from a non-significant level, thereby initiating the OCC engagement according to a conventional up-shift control.

The clutch engagement and disengagement timing results in a momentary activation of two torque flow paths through the gearing, thereby causing torque delivery to drop momentarily at the transmission output shaft. This condition, which can be referred to as a "torque hole," occurs before the OGC disengages. A vehicle occupant can perceive a large torque hole as an unpleasant shift shock. The preparatory phase is a time period prior to the torque phase. The inertia phase is a time period when the OGC starts to slip due to substantially reduced holding capacity, following the torque phase.

An automated manual transmission (AMT), a type of automatic shifting transmission used in motor vehicles, improves mechanical efficiency by removing the torque converter. Such automated manual transmissions typically include a plurality of power-operated actuators that are controlled by a transmission controller or some type of electronic control unit (ECU) to automatically shift synchronized clutches that control the engagement of meshed gear wheels, traditionally found in manual transmissions. During a shift of an AMT, the engine torque is disconnected from the vehicle via a clutch. The torque is interrupted while the transmission changes ratio. After the ratio is changed, the clutch reapplies connecting the engine back to the drivetrain. The problem with this approach is that during the torque interruption, the driver is lunged forward in the cab and then lunged backwards when the engine hooks back up with the drivetrain. This shift event can be as long as a second. It is an undesirable "shift feel". Also the vehicle has no acceleration during this transition leading to undesirable driving situations (pulling out into traffic, merging, etc.).

An article having citation: Lacerte, M. Pouliot, G., Plante, J., and Micheau, P., "Design and Experimental Demonstration of a Seamless Automated Manual Transmission using Eddy Current Torque Bypass Clutch for Electric and Hybrid Vehicles," *SAE Int. J. Alt. Power.* 5(1):2016, discloses a seamless AMT architecture for EVs and Hybrid Electric Vehicles (HEVs) using an eddy current torque bypass clutch. The eddy current clutch relies on the principle of electromagnetic coupling between two parts moving at different speeds. When a conductive part is moving perpendicular through a time-varying or an inhomogeneous magnetic field, an electric field is induced, which in turn generates eddy currents within the conductive material according to Faraday's law of induction. These circulating eddies are swirling in such a way to create a secondary magnetic field which oppose the change in primary magnetic flux (Lenz's law). The interaction between these fields causes an electromagnetic coupling force (Lorentz force). The magnitude of these forces depends primarily on the varying field amplitude, relative speeds (slip speed) and geometric dimensions of rotating components.

The following U.S. patent documents are related to this technology: U.S. Pat. Nos. 9,350,225; 9,130,446; 7,990,007 and 2016/0290426.

U.S. Pat. No. 7,942,781 discloses a high-efficiency vehicular transmission. The transmission includes a transmission housing, a set of torque delivery elements which include first and second elements supported for rotation within the housing and an electric motor for changing angular velocity of at least one of the elements in response to an electrical signal during a shift to obtain a desired transmission ratio. At least one non-friction controllable coupling assembly has a coupling state for coupling the first element to either the second element or the housing and an uncoupling state for uncoupling the first element from either the second element or the housing, respectively. The at least one coupling assembly is non-hydraulically controlled to change state to maintain the desired transmission ratio.

For purposes of this application, the term "coupling" should be interpreted to include clutches or brakes wherein one of the plates is drivably connected to a torque delivery element of a transmission and the other plates is drivably connected to another torque delivery element or is anchored and held stationary with respect to a transmission housing. The terms "coupling", "clutch" and "brake" may be used interchangeably.

Summary of Example Embodiments

An object of at least one embodiment of the present invention is to provide a powertrain or drive system including a transmission for an electric vehicle wherein occupants of the vehicle experience improved "shift feel".

In carrying out the above object and other objects of at least one embodiment of the present invention, a vehicle drive system including a transmission having a plurality of operating modes is provided. The system includes a transmission output shaft, a stationary member, and an electric powerplant having a rotary drive shaft connecting with the transmission output shaft. A planetary gear set includes first and second elements connecting with the transmission output shaft. A non-friction controllable coupling assembly has a first coupling state for coupling the first element to the transmission output shaft, a second coupling state for coupling the second element to the transmission output shaft and an uncoupling state for uncoupling the transmission output shaft from the first and second elements. The coupling assembly is non-hydraulically controlled to change state. A magnetic coupling device is provided to magnetically transfer a portion of rotating mechanical energy of the electric powerplant to the transmission output shaft in response to an electrical signal to synchronize angular velocities of the shafts during a change in state of the coupling assembly. Torque is transferred to the transmission output shaft during the change in state.

The electric powerplant may include a single electric motor having a stator and a rotor.

The magnetic coupling device may comprise an eddy current by-pass clutch.

The torque converter may include at least one coil coupled to the rotor to rotate therewith and a target part magnetically coupled to the at least one coil across an air gap.

The air gap may be a radial air gap or an axial air gap.

The system may further include a transformer including a rotating part to energize the at least one coil.

The coupling assembly may have a coupling state for coupling the transmission output shaft to the stationary member to provide a park function for the transmission.

The coupling assembly may include a controllable mechanical diode (CMD) having a coupling state for coupling the planetary gear set to the stationary member to provide a park function for the transmission.

The at least one clutch may include a dog clutch.

The group of gears may be coupled to the rotary drive shaft to rotate therewith. The stationary number may be a transmission housing.

The vehicle may be an electric vehicle.

The transmission may be an automatic transmission (AT) wherein the drive shaft and the output shafts are substantially concentric.

BRIEF DESCRIPTION OF THE DRAWINGS

FIG. 3a is a schematic view, partially broken away, of the 3-position linear motor CMD magnetically latching the two-way controllable mechanical diodes/dog cogs and showing how different gears can be selected;

FIG. 3b is a magnetic latching force diagram referred to in the view of FIG. 3a;

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
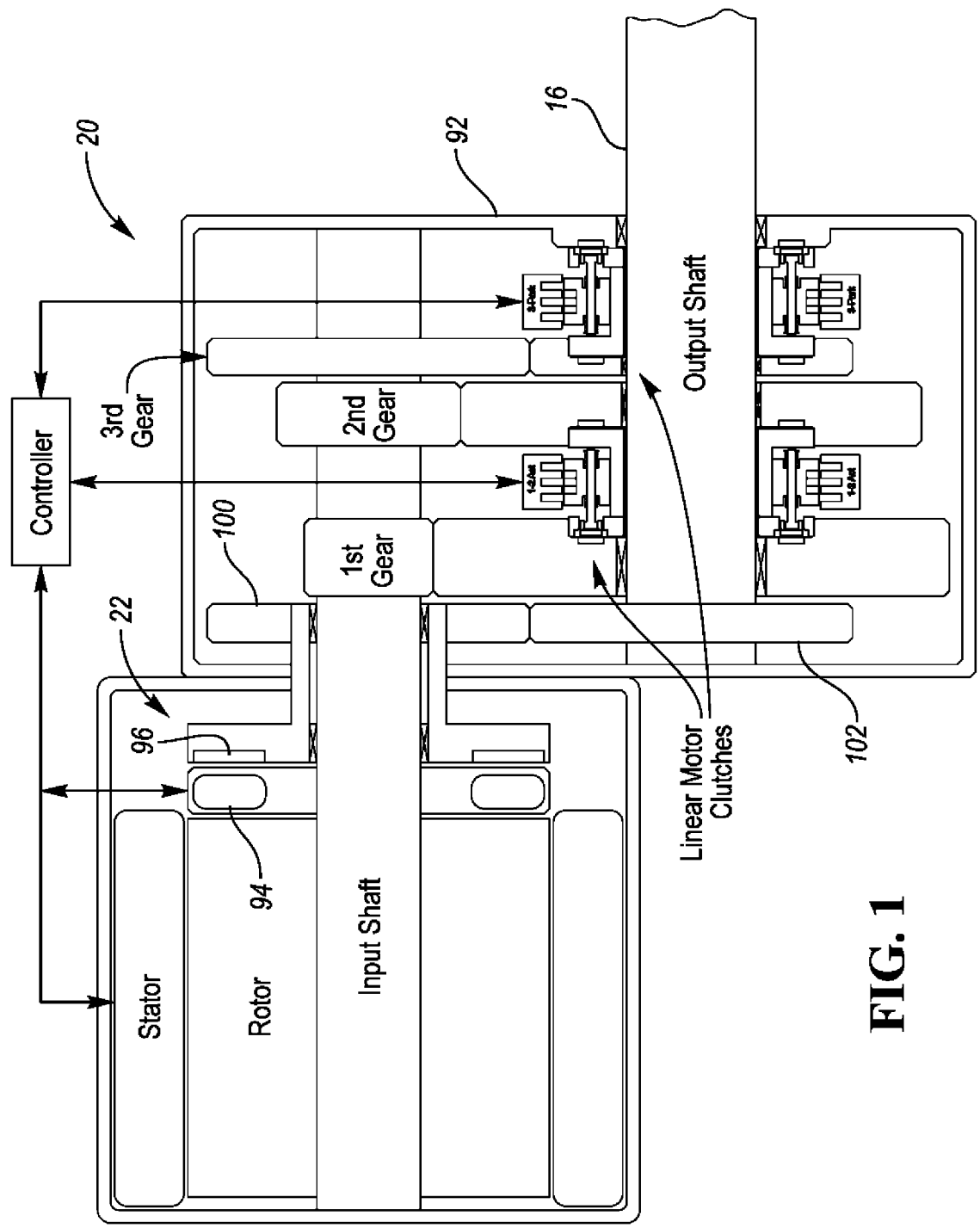
FIG. 1 is a schematic view, partially broken away, of an electric, 3-speed, automated manual transmission (AMT) including three forward gears, a magnetic torque converter and a pair of 3-position, linear motor, controllable mechanical diodes (CMDs)

FIG. 1 is a schematic view of an electric, 3-speed, automated manual transmission (AMT), generally indicated at 20, including three forward gears (i.e., $1^{st}$ gear, $2^{nd}$ gear and $3^{rd}$ gear), a magnetic torque converter, generally indicated at 22, and a pair of 3-position, linear motor, controllable mechanical diodes (CMDs) (i.e. linear motor clutches).

The AMT 20 includes a transmission output shaft 16, a stationary member such as a transmission housing 92 and an electric powerplant such as an electric motor having a rotary drive shaft (i.e. input shaft) connecting with the transmission output shaft 16. The electric motor preferably also includes a stator and a rotor.

The AMT above includes the forward gears i.e. (first, second and third elements or gears) connecting with the transmission output shaft 16. A non-friction controllable coupling assembly includes the first linear motor clutch having a first coupling state for coupling the first gear to the transmission output shaft 16, a second coupling state for coupling the second gear to the transmission output shaft 16 and an uncoupling state for uncoupling the transmission output shaft 16 from the first and second gears. The coupling assembly is non-hydraulically controlled to change state.

A magnetic coupling device such as the magnetic torque converter 22 magnetically transfer a portion of rotating mechanical energy of the electric motor to the transmission output shaft 16 in response to an electrical signal from a controller to synchronize angular velocities of the shafts during a change in state of the coupling assembly wherein torque is transferred to the transmission output shaft 16 during the change in state. The torque converter 22 may include at least one coil 94 coupled to the rotor to rotate therewith and a target part 96 magnetically coupled to the at least one coil 94 across an air gap.

Figure 2:
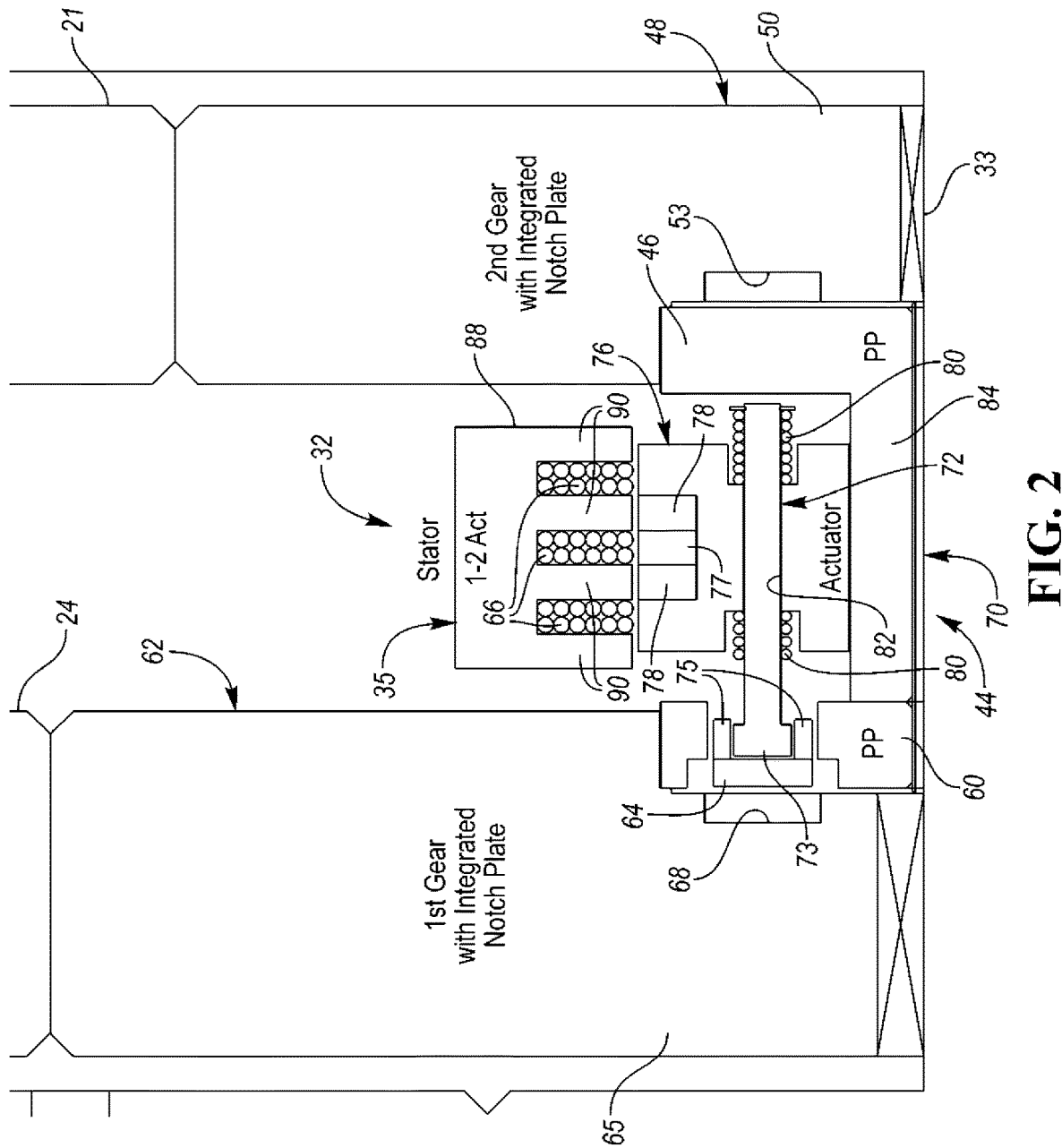
FIG. 2 is an enlarged schematic view, partially broken away, of the view of FIG. 1 to particularly illustrate one of the CMDs and two of the gears with integrated notch plates coupled to the transmission output shaft via pocket plates (i.e. PPs)
Figure 3:
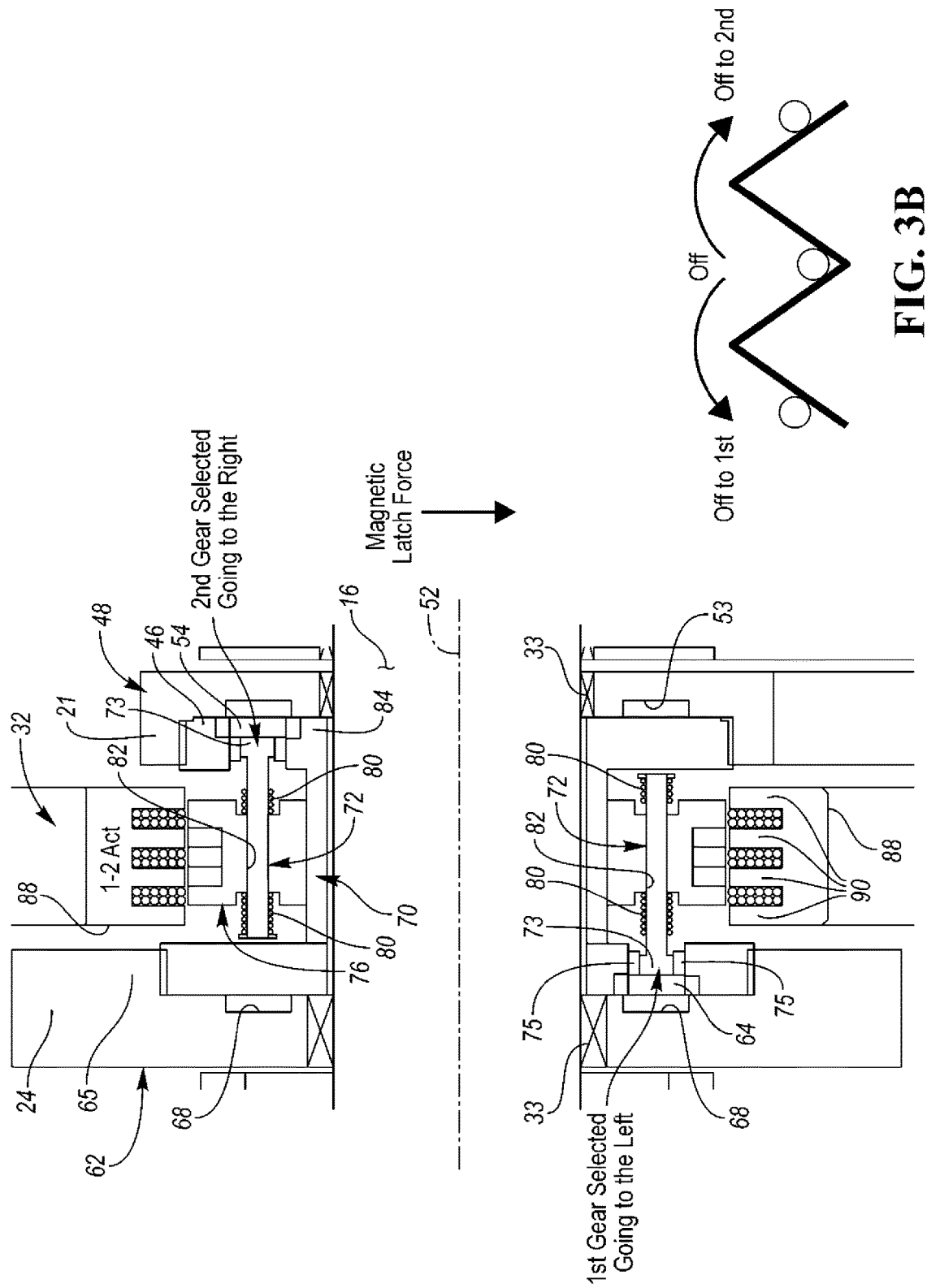

Referring now to FIGS. 2, 3a and 3b, FIG. 2 is an enlarged view of the view of FIG. 1 to particularly illustrate one of the CMDs and two of the gears with integrated notch plates coupled to the transmission output shaft 16 via pocket plates (i.e., PPs).

FIG. 3a is a schematic view of the 3-position linear motor CMD magnetically latching the two-way controllable mechanical diodes/dog cogs and showing how different gears can be selected.

FIG. 3b is a magnetic latching force diagram referred to in the view of FIG. 3a.

A preferred 3-position linear stepper motor assembly is generally indicated at 44. The 3-position linear stepper motor 44 forms a part of an overrunning, non-friction coupling or clutch and control assembly, generally indicated at 32.

The assembly 32 includes a pair of coupling members or plates 46 and 48. The plate 46 is a pocket plate (i.e., having pockets) and the plate 48 is a powdered metal $2^{nd}$ gear 21 integrated with a notch plate 50 which has notches 53. The plates 46 and 48 are supported for rotation relative to one another about a common rotational axis 52 (FIG. 3a) of the output shaft 16. The plate 48 is supported on the shaft 16 by bearing 33. A first locking member or strut (not shown) selectively mechanically couples the first pair of plates 46 and 48 together to prevent relative rotation of the first pair of plates 46 and 48 with respect to each other in at least one direction about the axis 52. A powdered metal first gear 24 is integrally formed with a notch plate 65 to form the plate 62 which has notches 68.

The assembly 32 includes a pair of coupling members or plates 60 (i.e. pocket plate) and 62 (notch plate) supported for rotation relative to one another about the common rotational axis 52 and a locking member or strut 64 for selectively mechanically coupling the second pair of plates 60 and 62 together to prevent relative rotation of the second pair of plates 60 and 62 with respect to each other in at least one direction about the axis 52.

The stepper motor 44 includes the stator subassembly 35 including at least one coil 66 (three shown) to create an electromagnetically switched magnetic field and to create a magnetic flux when the at least one coil 66 is energized via the controller of FIG. 1.

The stepper motor 44 further includes a magnetically-latching actuator subassembly, generally indicated at 70, including at least one bi-directionally movable connecting structure, such as spring-biased rods, generally indicated at 72. Each rod 72 is coupled to one of the first and second locking members 54 or 64 at an end portion 73 thereof for selective, small-displacement locking member movement. In particularly, each end portion 73 is pivotally connected to legs 75 of its locking member or strut 54 or 64 by pins (not shown but shown in the above mentioned parent application).

The actuator subassembly 70 further includes a magnetic actuator, generally indicated at 76, coupled to the rods 72 and mounted for controlled reciprocating movement along the rotational axis 52 relative to the first and second pairs of coupling members 46, 48, and 60, 62 between a first extended position which corresponds to a first mode of the first pair of coupling members 46 and 48 and a second extended position which corresponds to a second mode of the second pair of coupling members 60 and 62. The rod 72 actuates its locking member 64 in its extended position, so that the locking member 64 couples the pair of coupling members 60 and 62 for rotation with each other in at least one direction about the rotational axis 52.

A second rod 72 (FIG. 3a) actuates its locking member 54 to couple the pair of coupling members 46 and 48 for rotation with the magnetic actuator 76 completing a path of the magnetic flux to magnetically latch in the first and second extended positions. A control force caused by the magnetic flux is applied to linearly move the magnetic actuator 76 between the first and second extended positions along the rotational axis 52.

The magnetic actuator 76 preferably includes a permanent magnet source 77 sandwiched between a pair of annular field redirection rings 78. The magnetic source 77 is preferably an annular, rare earth magnet which is axially magnetized.

In other words, the electromechanical apparatus or motor 44 controls the operating mode of a pair of coupling apparatus, each of which has drive and driven members supported for rotation relative to one another about the common rotational axis 52 of the output shaft 16. Each drive member may be a pocket plate 46 or 60 and the driven member may be a notch plate 50 or 65. Each coupling apparatus or assembly may include two struts 54 or 64 for selectively mechanically coupling the members of each coupling assembly together and change the operating mode of each coupling assembly. Preferably, the struts 54 and 64 are spaced at 90° and/or 180° intervals about the axis 52.

The apparatus or motor 44 includes the stator subassembly 35 which has one or more (preferably three) electromagnetically inductive coils 66 to create a first magnetic flux when the coils 66 are energized.

The apparatus or motor 44 also includes the actuator subassembly 70 adapted for coupling with the members or plates of both of the coupling apparatus to rotate therewith. The motor 44 is supported on the output shaft 16 for rotation relative to the coils 66 about the rotational axis 52. The motor 44 typically includes two or more bi-directionally movable rods 72. Each rod 72 has the free end 73 adapted for connection to a strut for selective, small-displacement, strut movement.

The motor 44 also includes the actuator 76 operatively connected to the rods 72 for selective bi-directional shifting movement along the rotational axis 52 between a first position of the actuator 76 which corresponds to a mode (i.e. $2^{nd}$ gear) of the first coupling apparatus (plate 50 and plate 46) and a second position of the actuator 76 which corresponds to a mode (i.e. $1^{st}$ gear) of the coupling apparatus (plate 60 and plate 65). The two rods 72 are spaced 180° apart from one another as shown in FIG. 3a. The different modes may be locked and unlocked (i.e. free wheeling) modes.

A first magnetic control force is applied to the actuator 76 when the at least one coil 66 is energized to cause the actuator 76 to move between its first, second, and neutral positions along the axis 52 as shown in FIG. 3b.

The motor 44 includes a pair of spaced biasing spring members 80 for each rod 72 for exerting corresponding biasing forces on the actuator 76 in opposite directions along the axis 52 when the actuator 76 moves between its first, second and third positions along the axis 52. The actuator 76 has holes 82 for slideably receiving and retaining the connecting rods 72. When the actuator 76 moves, it pushes/pulls its respective springs between its faces and the ends of its corresponding rods 72.

The motor 44 includes a hub 84 adapted for coupling with plates 46 and 60 of the two coupling apparatus. The hub 84 is splined for rotation with the shaft 16 about the rotational axis 52. The hub 84 slidably supports the actuator 76 during corresponding shifting movement along the rotational axis 52.

The motor 44 includes of spaced stops (not shown), supported on the hub 84 to define the first and second positions of the actuator 76.

The motor 44 also preferably includes a set of spaced guide pins (not shown) sandwiched between inner surface of the actuator 76 and an outer surface of the hub 84 and extending along the rotational axis 52. The inner surfaces and the outer surface have V-shaped grooves or notches (not shown) formed therein to hold the guide pins. The actuator 76 slides on the guide pins during shifting movement of the actuator 76 along the rotational axis 52. The guide pins pilot the actuator 76 on the hub 84. The hub 84 also distributes oil to the guide pins.

The stator subassembly 35 includes a ferromagnetic housing 88 having spaced apart fingers 90 and the electromagnetically inductive coils 66 housed between adjacent fingers 90.

The actuator 76 is an annular part having the magnetic annular ring 77 sandwiched between the pair of ferromagnetic backing rings 78. The magnetic control forces magnetically bias the fingers 90 and their corresponding backing rings 78 into alignment upon coil energization. These forces latch the actuator 76 in the two "on" positions and the "off" position. The rings are acted upon by the stator subassembly 35 to move the actuator 76.

A hollow cylindrical bushing (not shown) may slidably support each rod 76 in its aperture 82 during bi-directional shifting movement thereof.

Referring again to FIG. 3a, the 3-position linear stepper motor 44 is shown magnetically latching the 2-way clutch assemblies. In the upper portion of FIG. 3a, the second gear is selected for rotation going to the right. In the lower portion of FIG. 3a, the first gear is selected going to the left. As shown in the saw-tooth graph in FIG. 3b, the magnetic latch force is "off" in the center.

Figure 4:
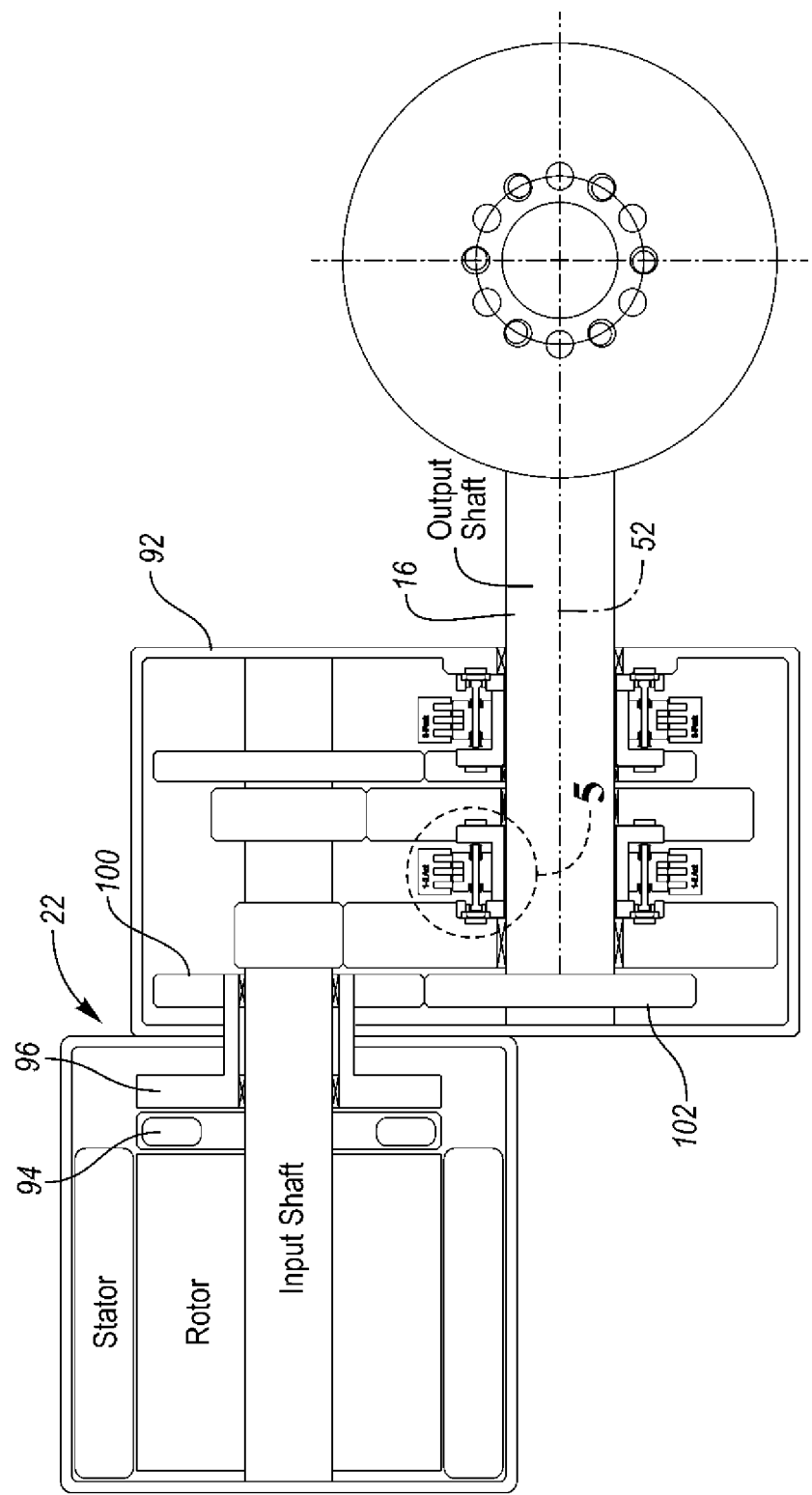
FIG. 4 is a schematic view of the AMT with a 3-position linear motor CMD and magnetically latching dog cogs in an end view.

FIG. 4 is a schematic view of a 3-position linear motor CMD magnetically latching dog cogs in an end view.

Figure 5:
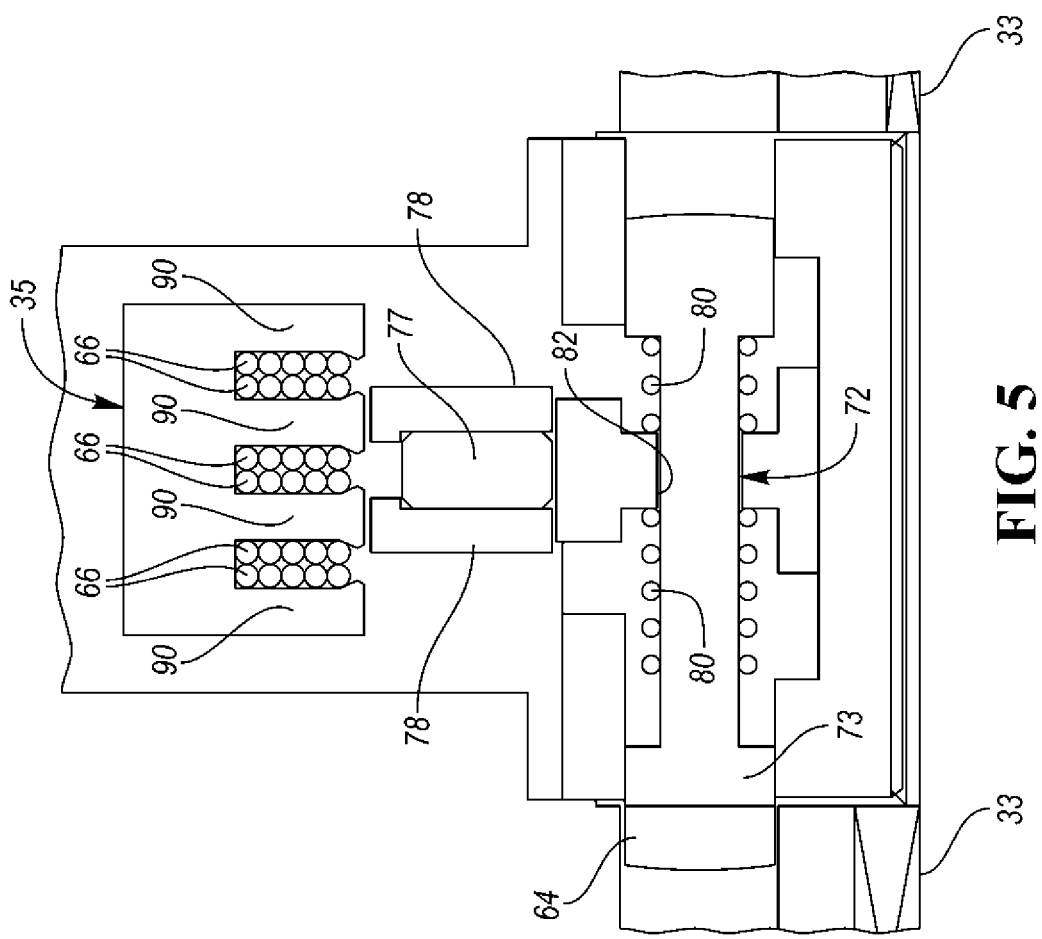
FIG. 5 is an enlarged view from the view of FIG. 4 showing, in detail, the 3-position, linear motor CMD and magnetically-latching dog cogs.

FIG. 5 is an enlarged view from the view of FIG. 4 showing, in detail, the 3-position linear motor CMD magnetically latching dog cogs. Instead of using struts, a dog clutch type clutch can also be used in the linear motor system. All dowels that lock into oval-shaped holes are provided. These dogs can transmit torque in both directions.

Figure 6:
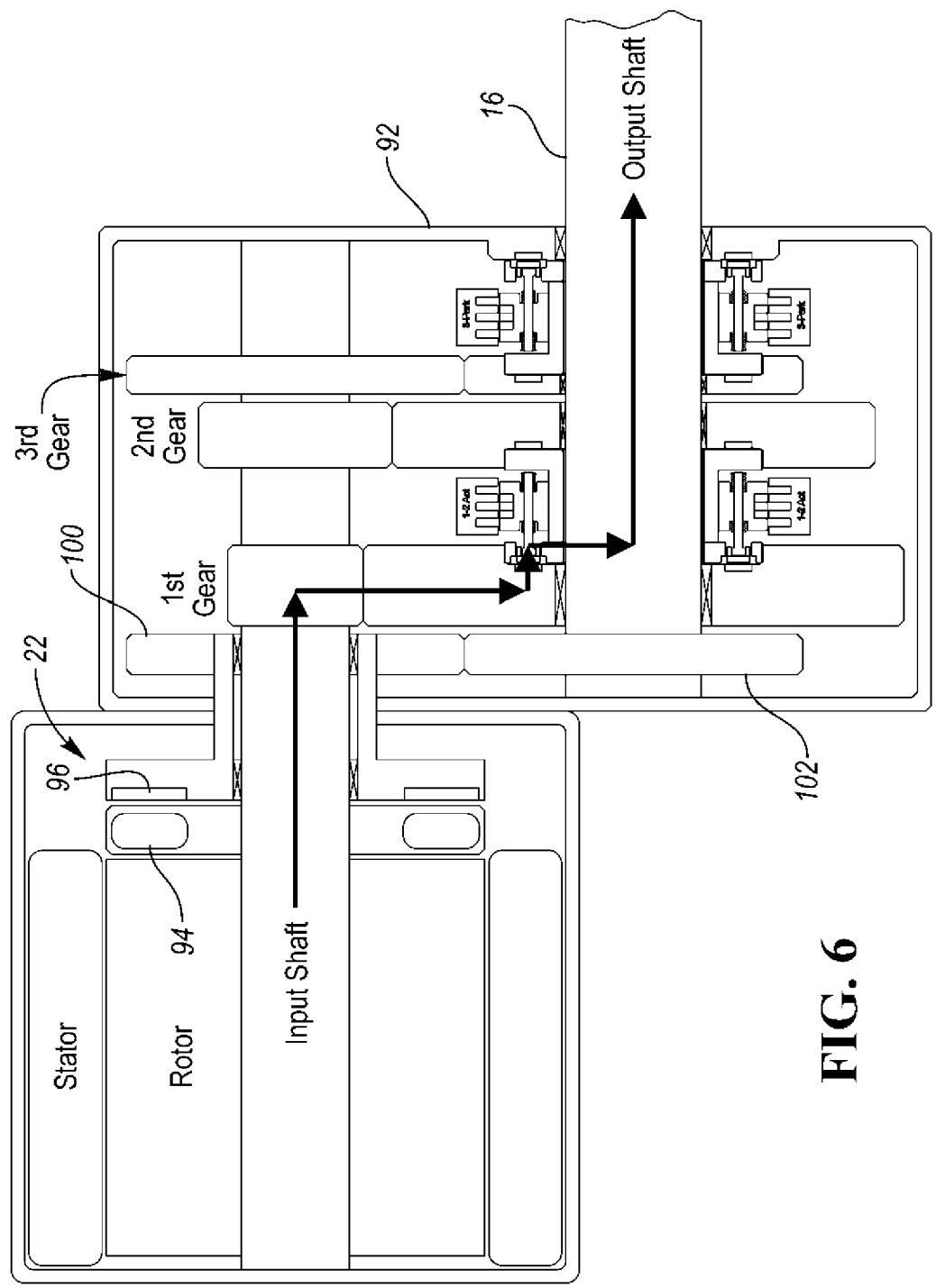
FIG. 6 is a schematic view of the AMT of FIG. 1 showing a first gear power or torque flow path.

FIG. 6 is a schematic view of the AMT of FIG. 1 showing a 1st gear power or torque flow path via arrows.

Figure 7:
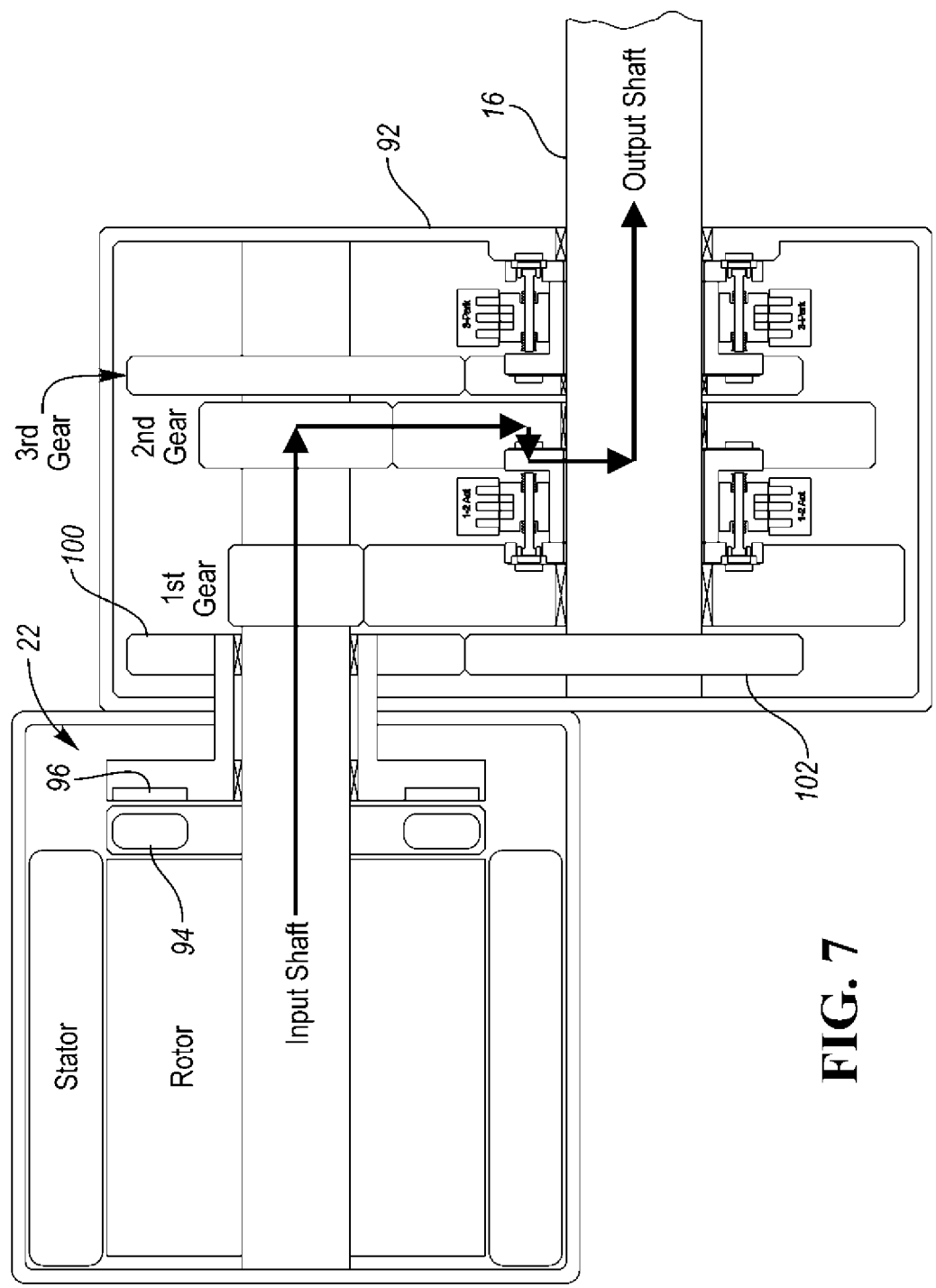
FIG. 7 is a view similar to the view of FIG. 6 but showing a 2nd gear power path.

FIG. 7 is a view similar to the view of FIG. 6 but showing a 2nd gear power path.

Figure 8:
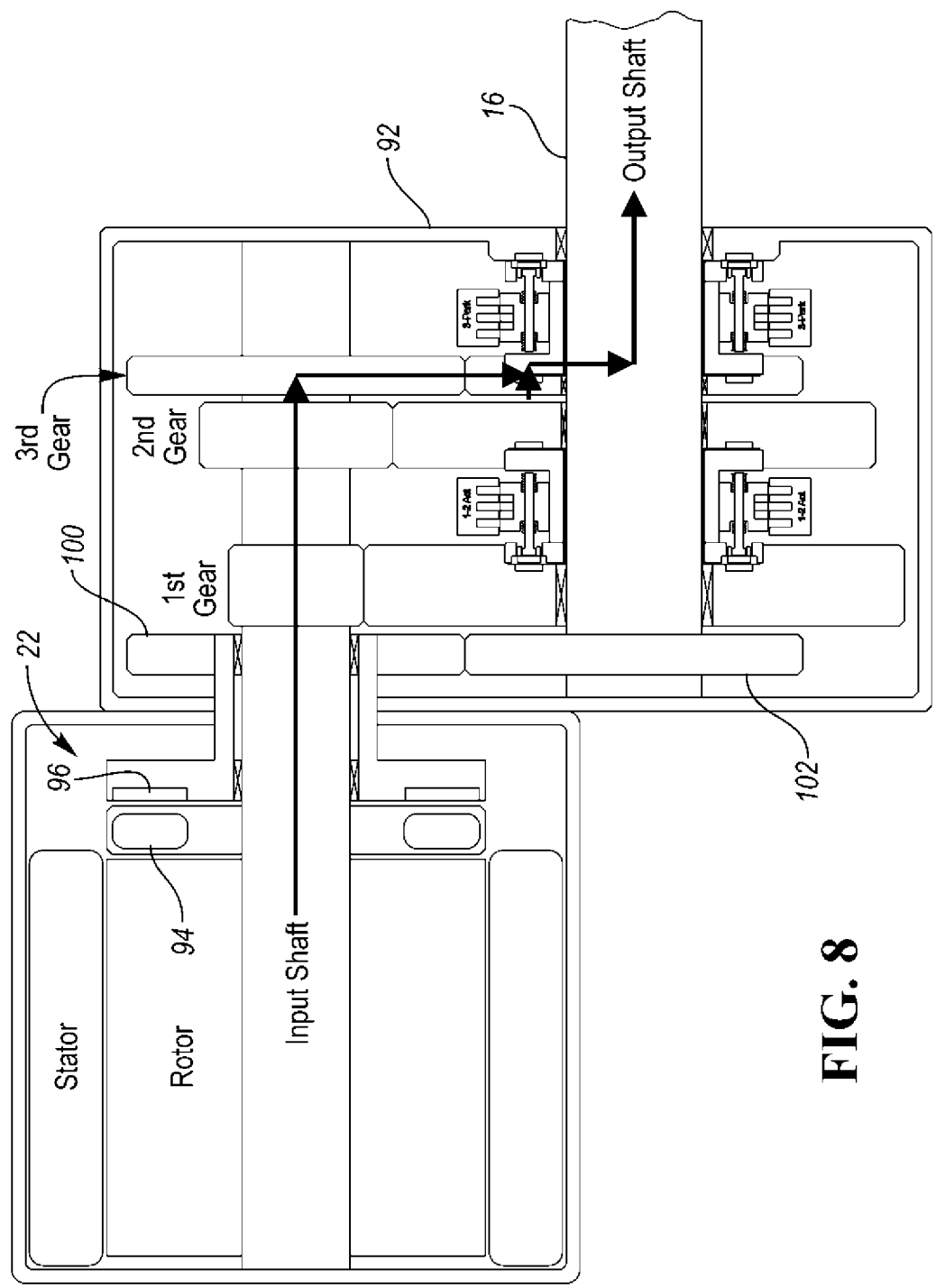
FIG. 8 is a view similar to the views of FIGS. 6 and 7 but showing a 3rd gear power path.

FIG. 8 is a view similar to the view of FIGS. 6 and 7 but showing a 3rd gear power path.

Figure 9:
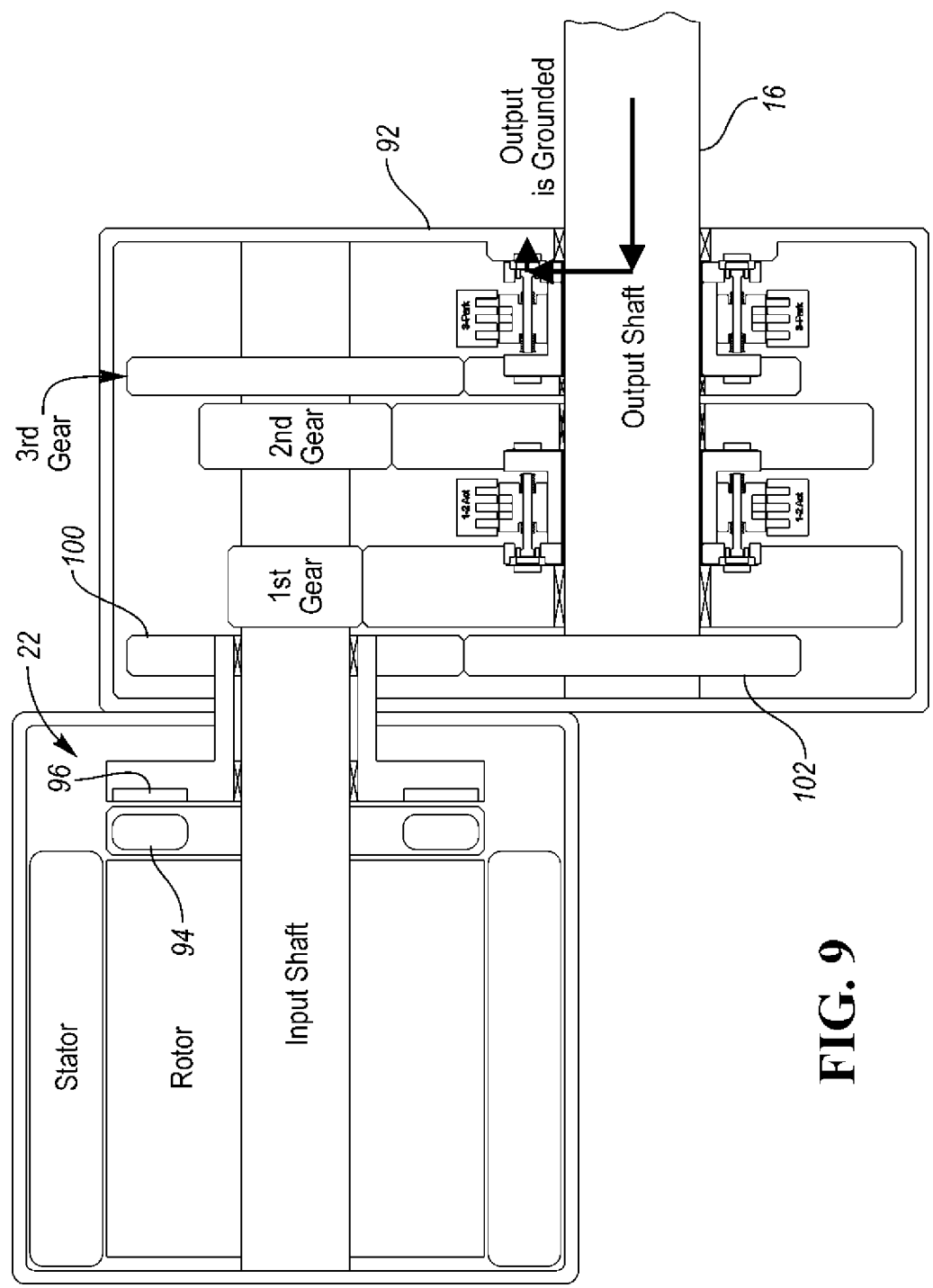
FIG. 9 is a view similar to the views of FIGS. 6, 7 and 8 but showing a park mode wherein the output shaft is grounded.

FIG. 9 is a view similar to the view of FIGS. 6, 7 and 8 but showing a park mode wherein the output shaft is grounded to the transmission housing 92.

Figure 10:
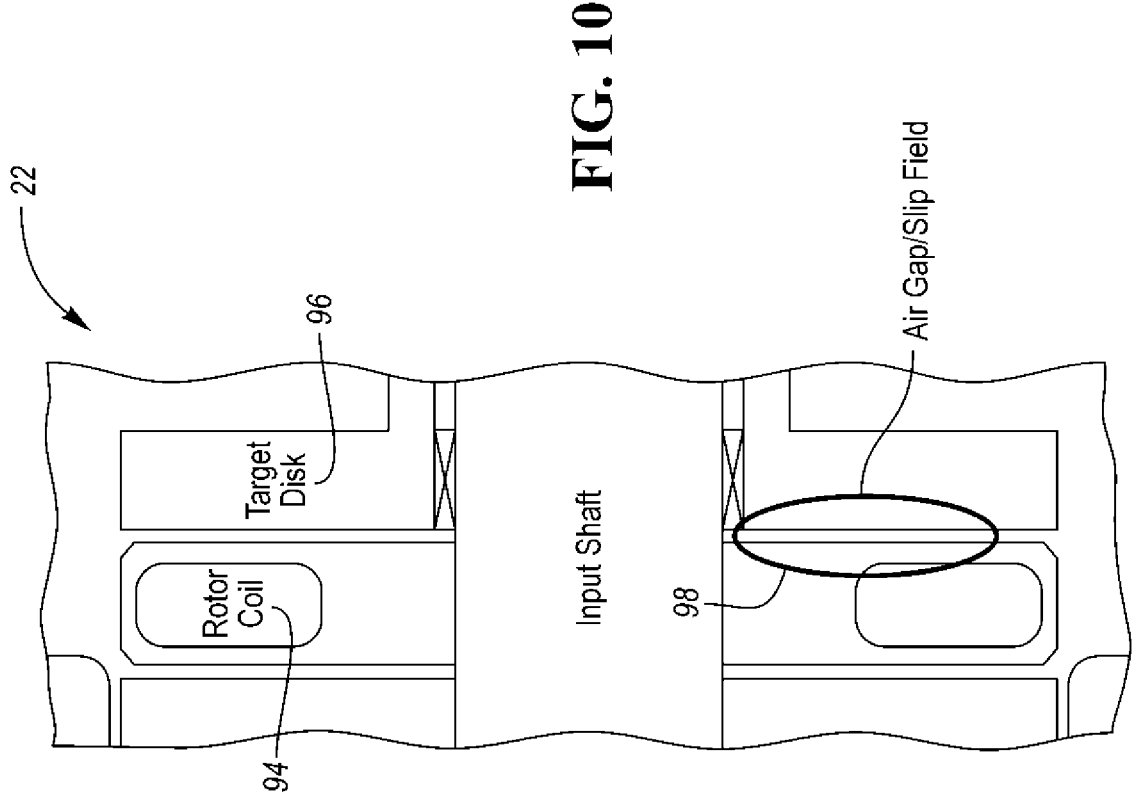
FIG. 10 is an enlarged schematic view, partially broken away, of the magnetic torque converter and particularly showing a rotor coil, target disk and air gap/slip field of the converter.
Figure 12:
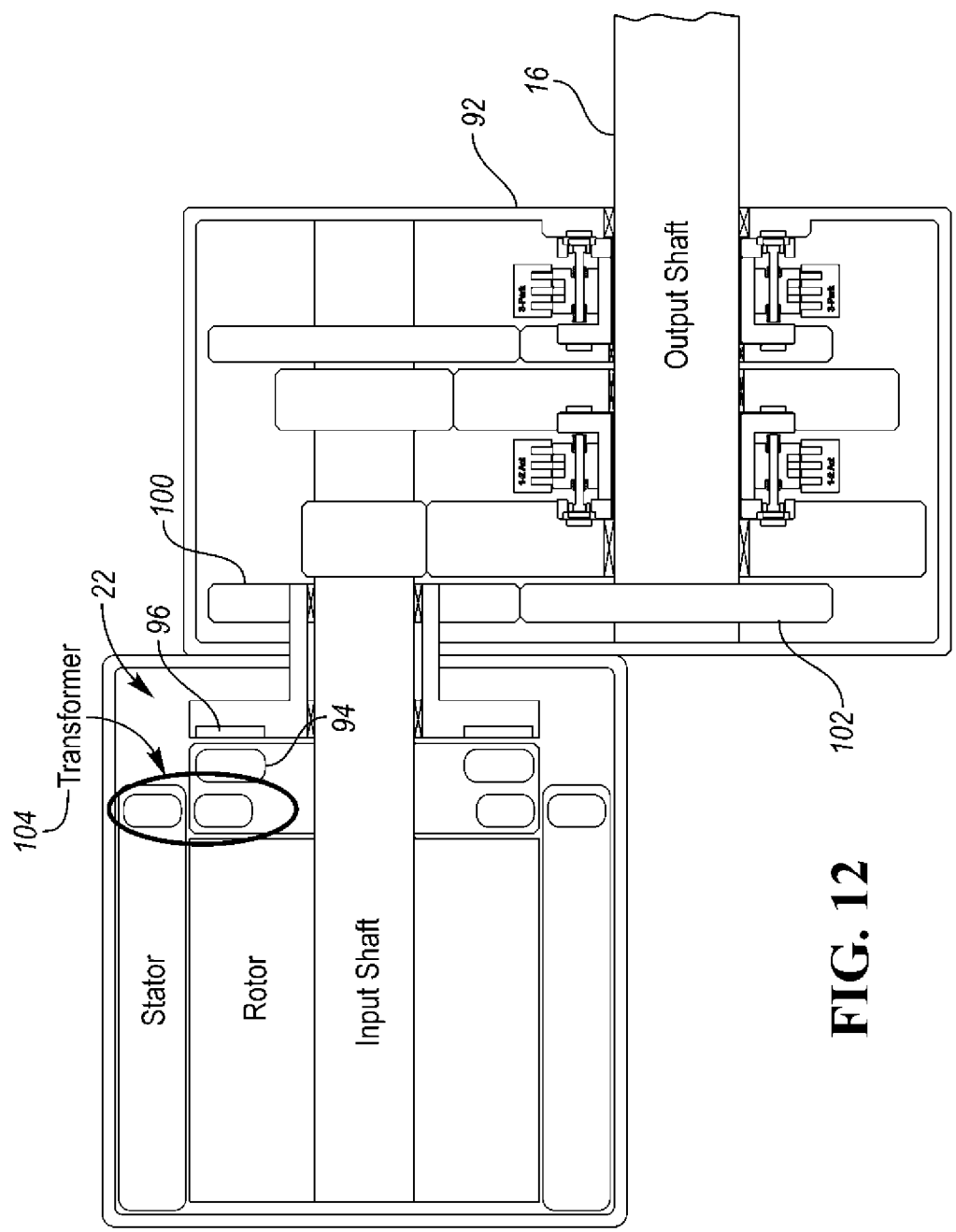
FIG. 12 is a view similar to the view of FIG. 1, but including a coil-powering transformer.

FIG. 10 is an enlarged schematic view of the magnetic torque converter (i.e. MTC) and particularly showing a rotor coil 94, a target disk 96 and a magnetic air gap/slip field 98 of the converter 22. The target disk 96 is preferably a soft steel plate that is hard connected to the transmission output shaft 16 via transfer gears 100 and 102 (FIG. 12). The MTC rotor coil 94 spins with the rotor of the motor.

Figure 11:
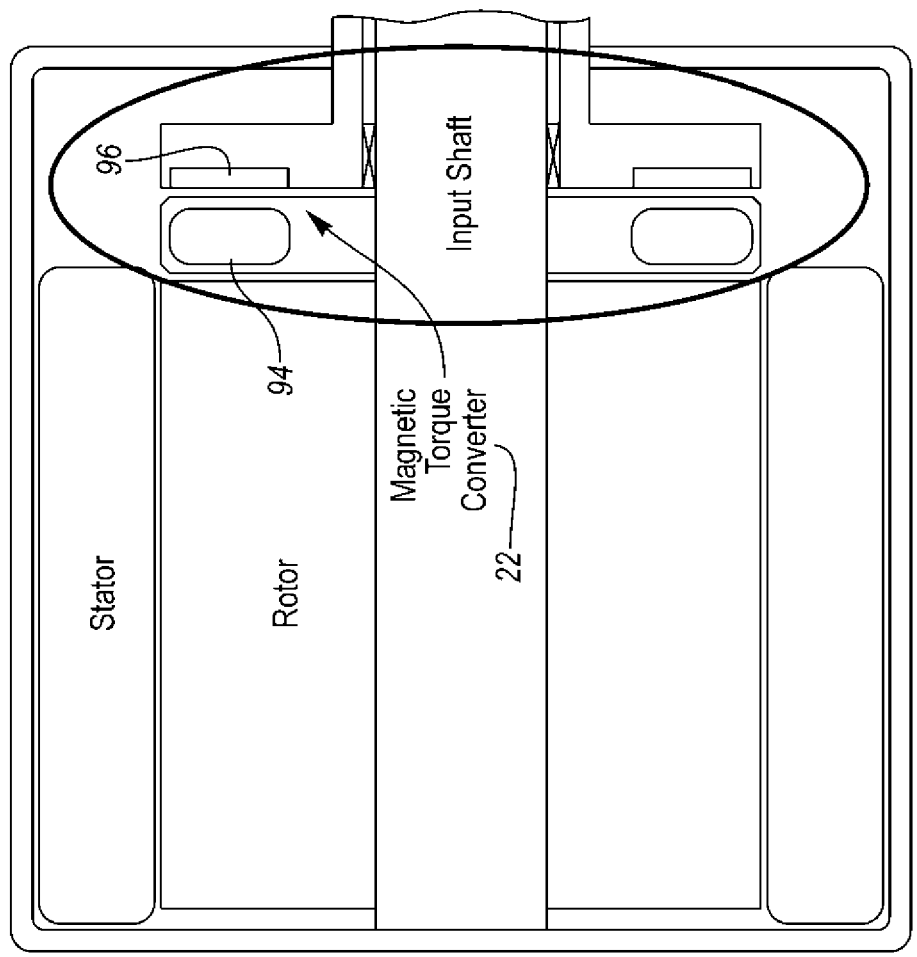
FIG. 11 is a schematic view of the torque converter of FIG. 10 (as shown by the oval) together with the electric motor of FIG. 1.

FIG. 11 is a schematic view of the torque converter 22 of FIG. 10 (as shown by the oval) together with the electric motor (i.e., stator, rotor and input shaft) of FIG. 1. During a shift, when the "OFF-going" clutch is OFF and before the "oncoming" clutch is synced and ON, the vehicle will experience no torque being delivered to the output of the vehicle. This is called a torque hole.

The MTC 22 is a device that attempts to partially fill the torque hole during the shift. During a shift, the MTC coils 94 spin with the e-motor rotor at a speed greater than the soft steel target wheel 96. Therefore a speed differential exists between the input coil 94 and the target wheel 96 which is attached to the output shaft 16 via gears 100 and 102. When the coil 94 is energized via the controller, torque is passed from the coil 94 to the target wheel 96 attempting to sync the speeds. The effect of this is that there is torque being transferred to the output shaft 16 while the e-motor rapidly slows to the proper speed to sync the oncoming clutch elements. This MTC 22 actually aids the e-motor to reach that sync point faster by pulling kinetic energy out of the e-motor rotor. Once the oncoming clutch is ON and the e-motor is delivering positive torque, the MTC coils 94 are turned off via the controller and spin with no losses. The shift is complete.

FIG. 12 is a view similar to the view of FIG. 1 but also including a transformer 104 which powers the coils 94. The rotating part of the transformer 104 energizes the MTC coils 94 that induce a synchronizing torque in the target disk or wheel 96.

Figure 13:
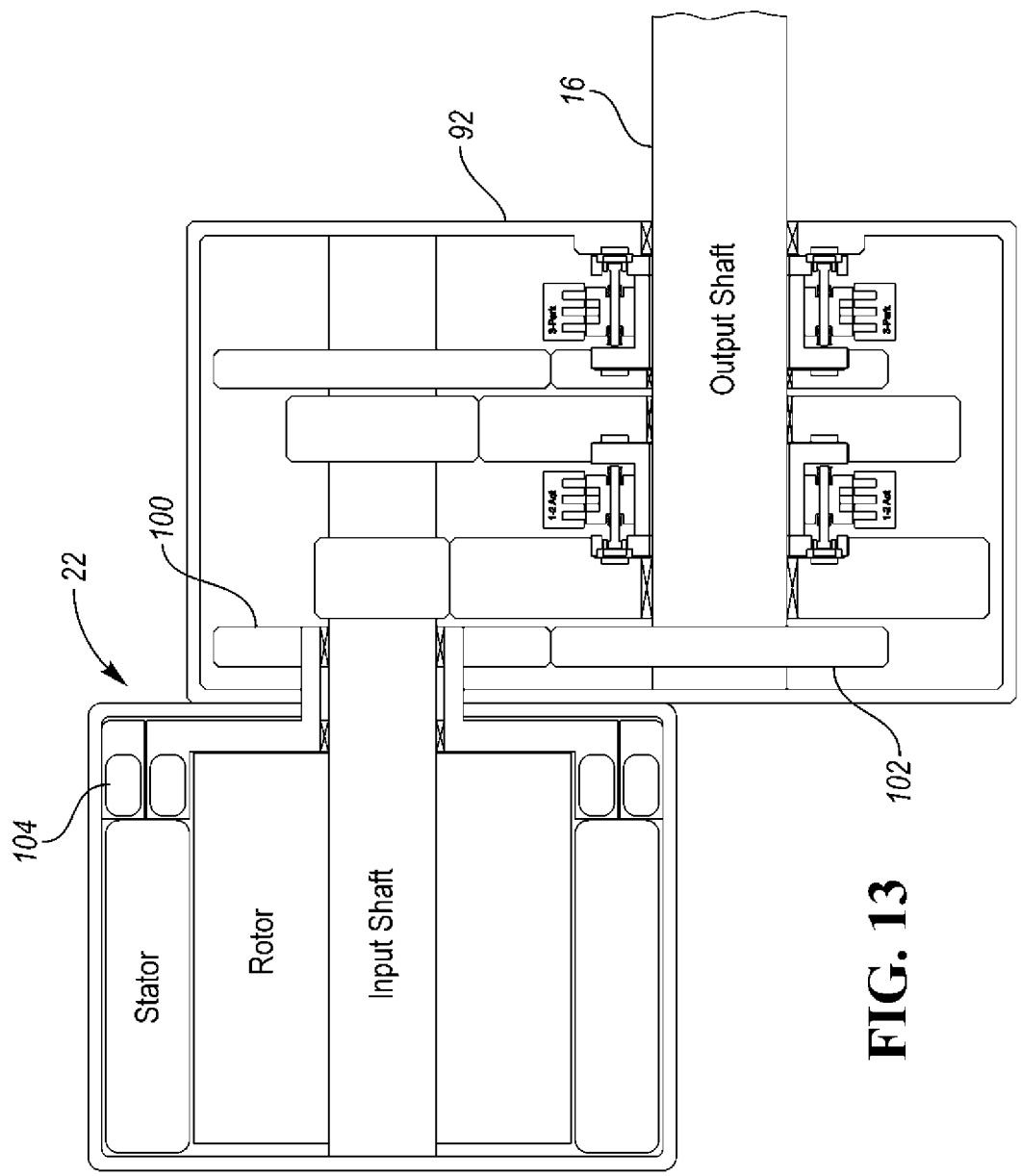
FIG. 13 is a view similar to the view of FIG. 12, except the coils of the transformer are oriented in a radial direction.

FIG. 13 is a view similar to the view of FIG. 12 except the coils of the transformer 104 are oriented in a radial direction.

Figure 14:
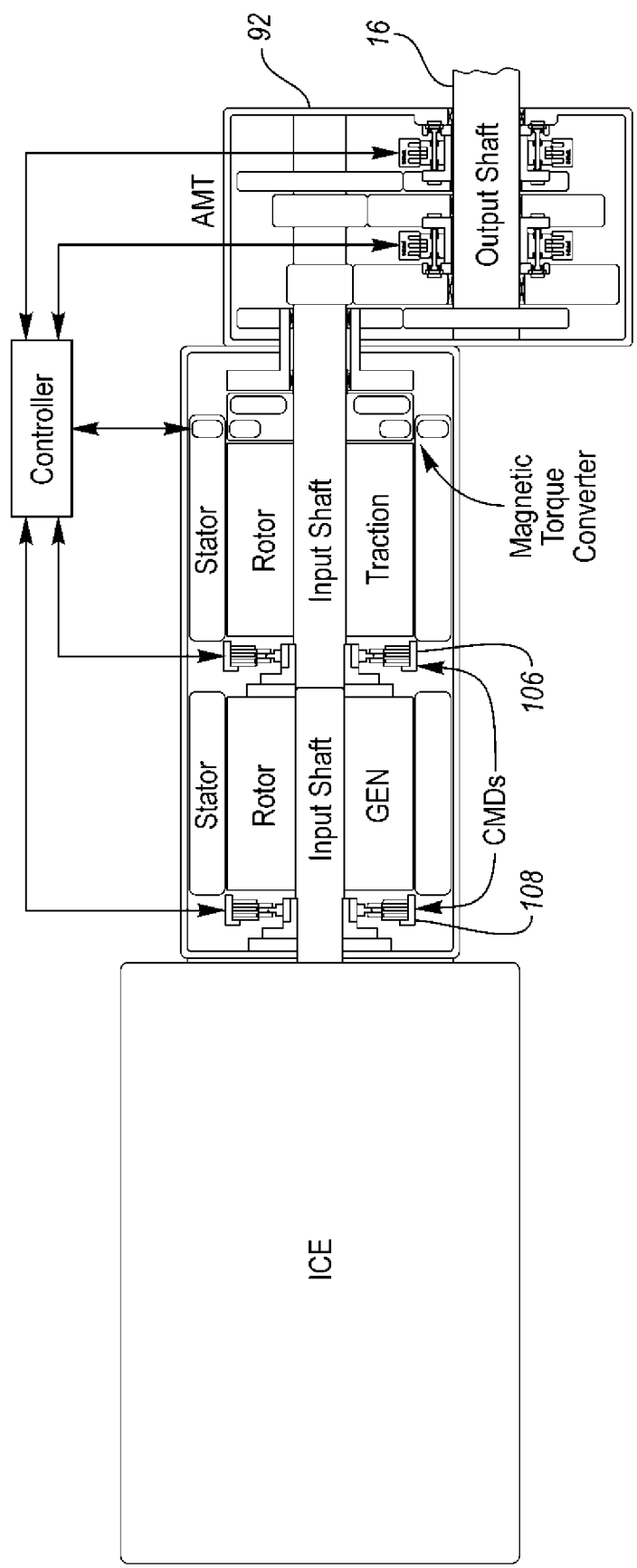
FIG. 14 is a schematic view of a plug-in, hybrid electric vehicle (PHEV) including the AMT of the prior figures.

FIG. 14 is a schematic view of a plug-in, hybrid electric vehicle (PHEV) including the AMT of the prior figures and a common controller. The PHEV also includes a second electric powerplant such as a motor-generator unit (i.e. GEN) having a second rotary drive or input shaft connecting with the transmission output shaft 16. A non-friction controllable coupling assembly 106 (CMD) has a coupling state for coupling the second electric powerplant to the transmission output shaft 16 and an uncoupling state for uncoupling the transmission output shaft 16 from the second electric powerplant. The coupling assembly 106 is non-hydraulically controlled via the controller to change state.

A non-electric powerplant such as an internal combustion engine (ICE) has an output shaft connecting with the transmission output shaft 16. A third non-friction, controllable coupling assembly 108 (CMD) has a first coupling state for coupling the non-electric powerplant (ICE) to the transmission output shaft 16 and an uncoupling state for uncoupling the non-electric powerplant from the transmission output shaft 16, the third coupling assembly 108 being non-hydraulically controlled via the controller to change state.

Figure 15:
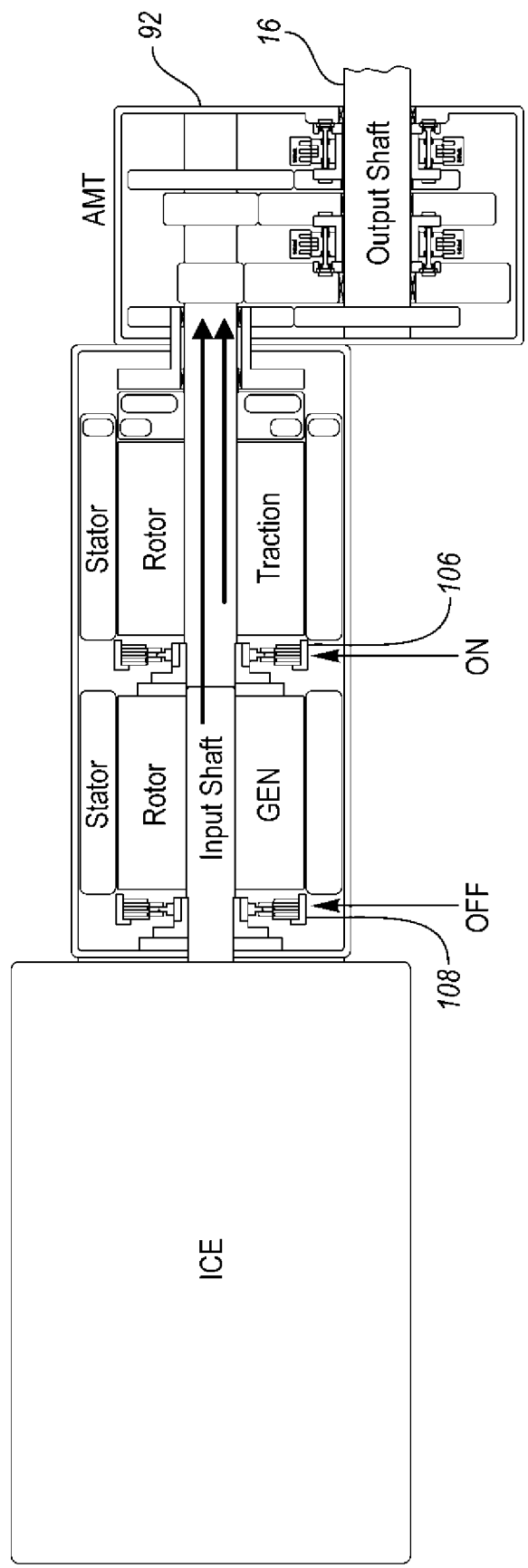
FIG. 15 is a schematic view of the PHEV of FIG. 14 in its EV mode with a generator boost.

FIG. 15 is a schematic view of the PHEV of FIG. 14 in its EV mode with a generator boost. The third CMD 108 is "OFF" and the second CMD 106 is "ON".

Figure 16:
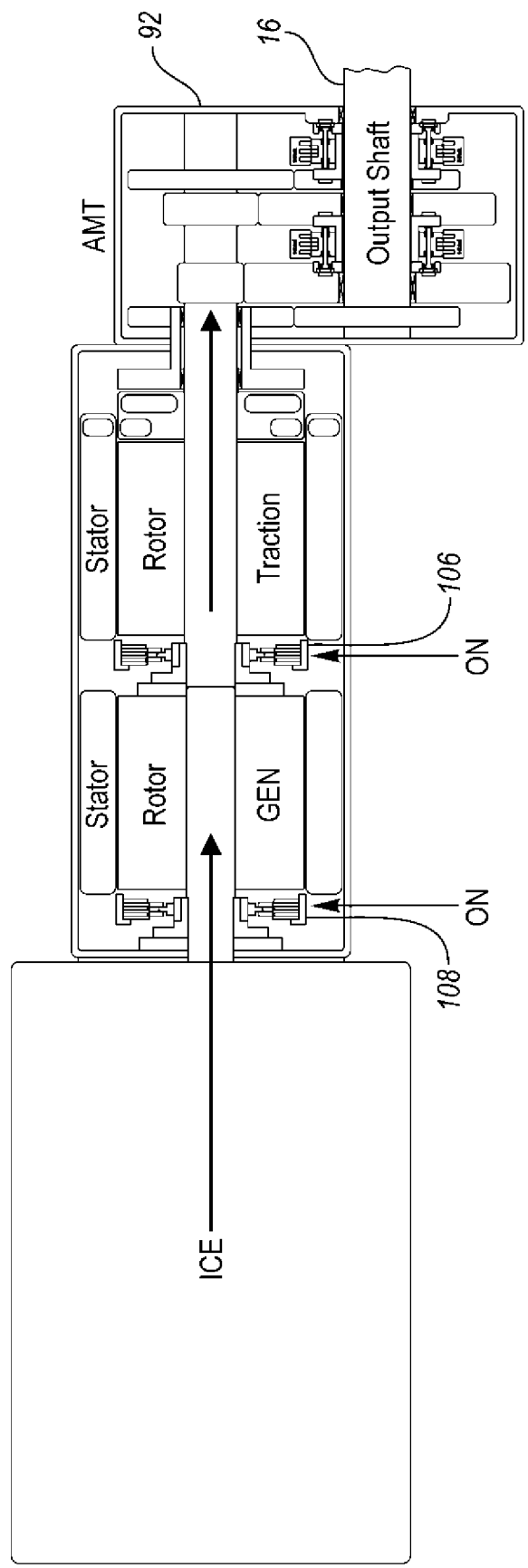
FIG. 16 is a view similar to the views of FIGS. 14 and 15 with the PHEV in a parallel hybrid mode or gas only mode (i.e. highway mode) in 3rd gear with electric boost on demand.

FIG. 16 is a view similar to the views of FIGS. 14 and 15 with the PHEV in a parallel hybrid mode or gas only mode (i.e. highway mode) in $3^{rd}$ gear with electric boost on demand. Both the second and third CMDs 106 and 108, respectively, are "ON".

Figure 17:
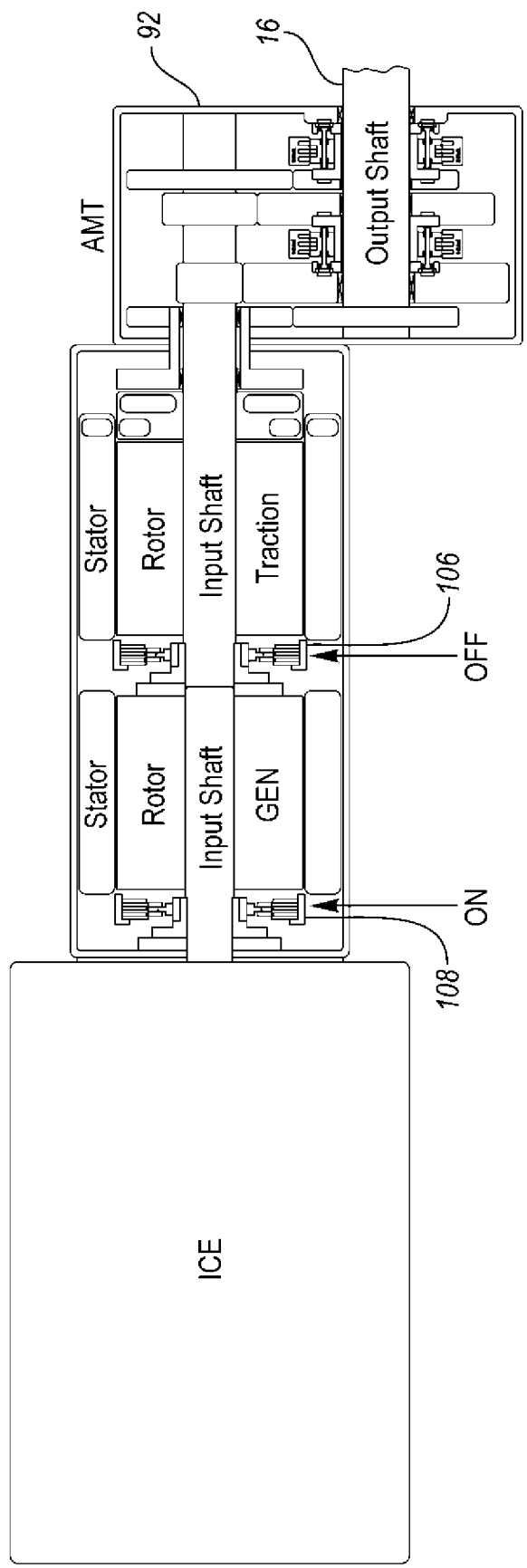
FIG. 17 is a view similar to the views of FIGS. 14, 15 and 16 with the PHEV in a second hybrid mode or a stationary generator mode (i.e., park, electric power generating mode)

FIG. 17 is a view similar to the views of FIGS. 14, 15 and 16 with the PHEV in a second hybrid mode or a stationary generator mode (i.e. park, electric power generating mode). The second CMD 106 is "OFF" and the third CMD 108 is "ON".

Figure 18:
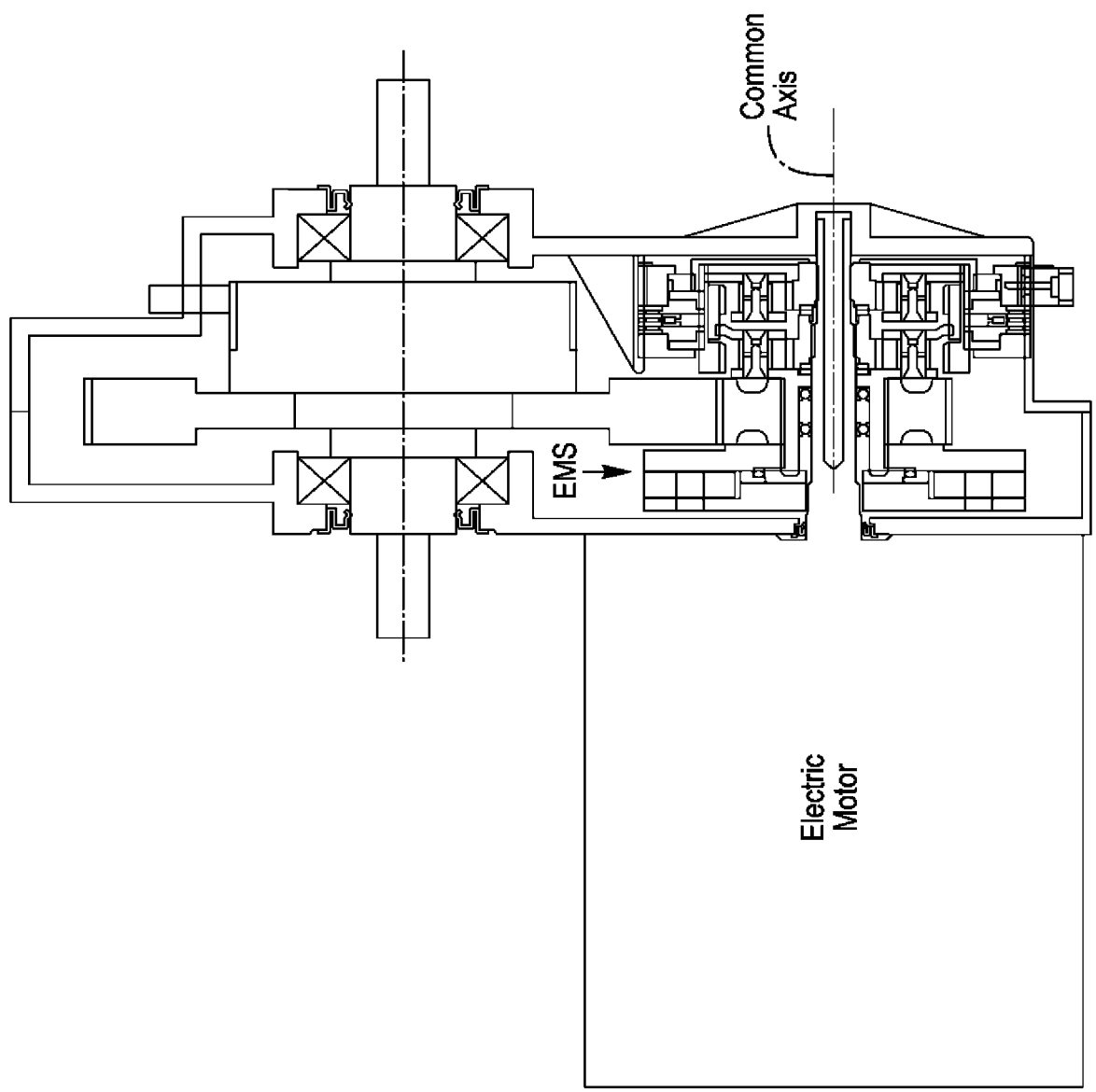
FIG. 18 is a schematic sectional view of a 3-speed step ratio automatic transmission (AT)
Figure 19:
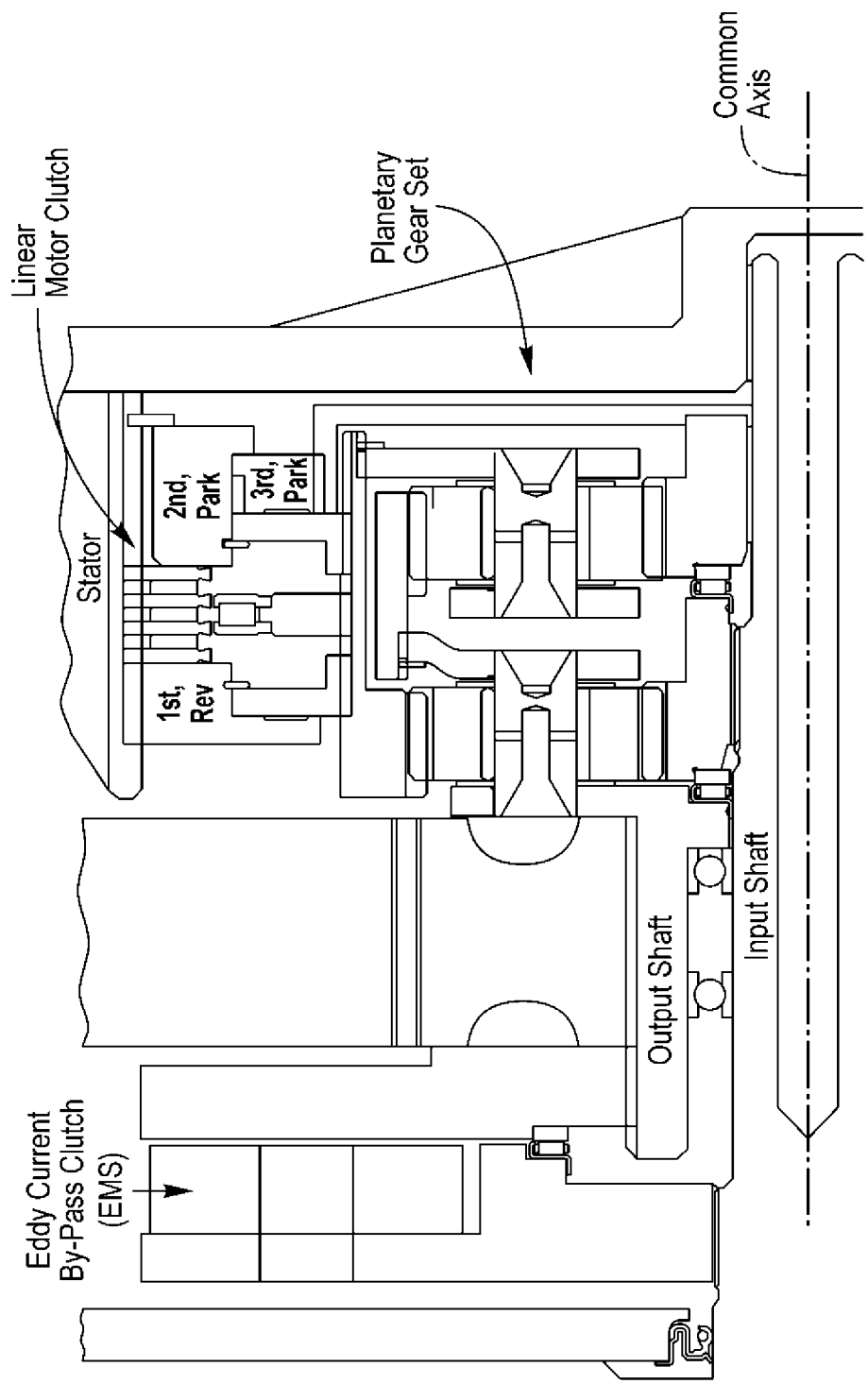
FIG. 19 is an enlarged view, partially broken away and in cross section, of the transmission of FIG. 18 and illustrating a kinetic energy management system (EMS) and a park function of the transmission.

FIGS. 18 and 19 are cross sections of a 3-speed synch shift transmission (SST) for a smart car EV. The item labeled EMS (Energy Management System) preferably comprises an eddy current by-pass clutch generally of the type disclosed in the above noted article and as described hereinabove. One difference between the transmissions of FIGS. 1 through 17 and FIGS. 18 and 19 is that the input and output shafts of FIGS. 18 and 19 are concentric to each other as they lie on a common center line. The AMT as described in FIGS. 1 through 17 is a layshaft design. The difference is AT architecture verses AMT architecture.

FIG. 19 specifically shows a park function provided by the CMD. There are a number of ways to provide this park function as follows:

A 2-way eCMD can directly be attached between the output of the transmission and ground. In this configuration the eCMD would be a dedicated park clutch.

Alternatively, if a transmission like the 3-speed SST uses eCMDs for the ratios, then the static eCMDs can achieve Park by flexing the eCMDs used for ratio. Any combination that ties up the transmission and grounds the tie up is Park. For example, the following combinations of clutches have to be "on" to achieve Park.

First and second gear grounding clutches both "on" achieves Park.

Third (direct) and second gear "on" will achieve Park.

Each embodiment of a drive system or powertrain constructed in accordance with the invention may utilize a main controller or TECU (transmission electronic control unit) (not shown) and one or more controllers as shown by the controllers in FIGS. 1 and 14. The controllers are preferably controlled by the TECU.

In general, the TECU provides and regulates the power to drive the various rotary and linear motors through one or more controllers. Each controller typically has a microcontroller (i.e. MCU) including circuitry. Each controller typically receives command signals from the remote electronic control unit (TECU) over or through a vehicle-based bus.

Preferably, control logic used by the TECU and/or the controller is implemented primarily in software executed by a microprocessor-based controller or the microcontroller (i.e. MCU). Of course, the control logic may be implemented in software, hardware, or a combination of software and hardware depending upon the particular application. When implemented in software, the control logic is preferably provided in a computer-readable storage medium having stored data representing instructions executed by a computer. The computer-readable storage medium or media may be any of a number of known physical devices which utilize electric, magnetic, and/or optical devices to temporarily or persistently store executable instructions and associated calibration information, operating variables, and the like.

The TECU and the controller are connected via a vehicle bus such as a local interconnect network (LIN or CAN) line or bus capable of two-way communications. LIN is one of many possible in-vehicle local area network (LAN) communications protocols. A power line and a ground line may be provided between the TECU and the controller. Each controller typically includes a transceiver interface within the MCU, a microprocessor and its control logic within the MCU, and a motor drive or driver, and an electrical power source. Each controller may be integrated or physically coupled within the transmission housing, while the TECU is provided some distance away from the housing.

The MCU of the motor controller typically includes a memory and may be configured as a conventional microcomputer including a CPU, a ROM, a RAM and the like or as a hardwired logic circuit.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle drive system including a transmission having a plurality of operating modes, the system comprising:
    a transmission output shaft;
    a stationary member;
    an electric powerplant having a rotary drive shaft connecting with the transmission output shaft;
    a planetary gear set including first and second elements connecting with the transmission output shaft;
    a non-friction controllable coupling assembly having a first coupling state for coupling the first element to the transmission output shaft, a second coupling state for coupling the second element to the transmission output shaft and an uncoupling state for uncoupling the transmission output shaft from the first and second elements, the coupling assembly being non-hydraulically controlled to change state; and
    a magnetic coupling device configured to magnetically transfer rotating mechanical energy of the electric powerplant to the transmission output shaft in response to an electrical signal to synchronize angular velocities of the transmission output shaft and the rotary drive shaft during a change in state of the coupling assembly wherein torque is transferred to the transmission output shaft during the change in state.

2. The system as claimed in claim 1, wherein the electric powerplant includes a single electric motor having a stator and a rotor.

3. The system as claimed in claim 2, wherein the magnetic coupling device comprises an eddy current by-pass clutch.

4. The system as claimed in claim 3, wherein the magnetic coupling device includes at least one coil coupled to the rotor to rotate therewith and a target part magnetically coupled to the at least one coil across an air gap.

5. The system as claimed in claim 4, wherein the air gap is a radial air gap.

6. The system as claimed in claim 4, wherein the air gap is an axial air gap.

7. The system as claimed in claim 4, further comprising a transformer including a rotating part to energize the at least one coil.

8. The system as claimed in claim 1, wherein the coupling assembly has a coupling state for coupling the transmission output shaft to the stationary member to provide a park function for the transmission.

9. The system as claimed in claim 1, wherein the coupling assembly includes a controllable mechanical diode (CMD) having a coupling state for coupling the planetary gear set to the stationary member to provide a park function for the transmission.

10. The system as claimed in claim 8, wherein the coupling assembly includes a dog clutch.

11. The system as claimed in claim 1, wherein the gear set is coupled to the rotary drive shaft to rotate therewith.

12. The system as claimed in claim 1, wherein the stationary member is a transmission housing.

13. The system as claimed in claim 1, wherein the vehicle is an electric vehicle.

14. The system as claimed in claim 1, wherein the transmission is automatic transmission (AT).

* * * * *